J. S. GLEDHILL & H. D. BELMER.
FILTER.
APPLICATION FILED NOV. 8, 1909.
965,451.
Patented July 26, 1910.
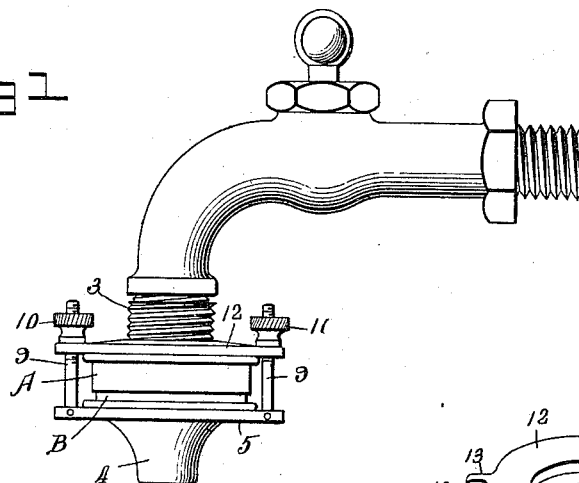
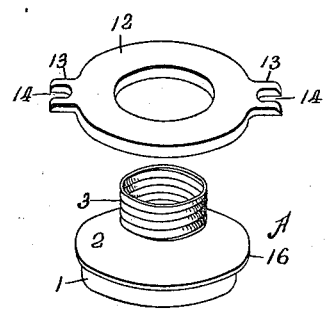
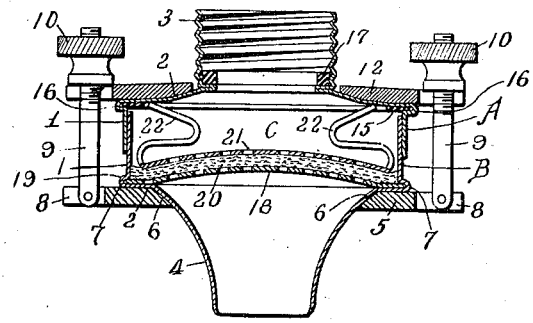
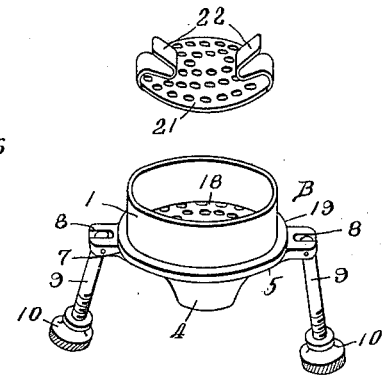
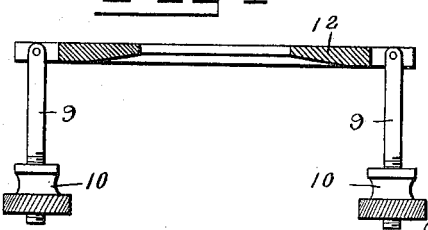
Witnesses
H. A. Robinette
C. C. Warun
Inventors
Jos. S. Gledhill
Hilton D. Belmer
By Meyers, Cushman & Rea,
Attorneys

UNITED STATES PATENT OFFICE.

JOSEPH S. GLEDHILL, OF PLYMOUTH, MASSACHUSETTS, AND HILTON D. BELMER, OF JERSEY CITY, NEW JERSEY, ASSIGNORS TO THE INTERNATIONAL FILTER COMPANY, OF NEW YORK, N. Y., A CORPORATION OF NEW JERSEY.

FILTER.

965,451.  Specification of Letters Patent.  Patented July 26, 1910.

Application filed November 8, 1909. Serial No. 526,789.

*To all whom it may concern:*

Be it known that we, JOSEPH S. GLEDHILL and HILTON D. BELMER, citizens of the United States, residing, respectively, at Plymouth, in the county of Plymouth and State of Massachusetts, and Jersey City, in the county of Hudson and State of New Jersey, have invented new and useful Improvements in Filters, of which the following is a specification.

Our present invention relates to certain new and useful improvements in filters and more particularly to filters of the type especially designed for attachment directly to a faucet.

One object of the invention is to provide a filter from which the filtering material or medium may be easily and quickly removed and a new supply substituted therefor when required, and this without removing the entire filter from the faucet.

A further object of the invention is to provide a simple construction of sectional filter chamber, the sections of which may be stamped up or drawn from relatively thin sheet metal, and associate with the closure wall of each section, an annular strengthening plate in order to give increased strength and rigidity to the structure; the said strengthening plates carrying the means for detachably connecting together the two sections of the filter chamber.

The invention has in view other more or less important objects all of which will be made clear in the following detailed description taken in connection with the accompanying drawing.

Stated in specific terms, the filter constituting the present invention comprises two substantially similar sections, one of which telescopes within the other, each section comprising a rim and a relatively broad and substantially flat annular cover wall, with a centrally disposed neck, the neck on one section being threaded for attachment to a faucet, a plate overlying the said annular wall of each section, and each plate having an opening to accommodate the neck of the section with which it is associated and also having diametrically opposed notched extensions, one of the said plates being secured to its associated section and the other resting loosely upon its filter section, there being bolts pivoted between the notched extensions of one plate and adapted to enter the notches in the other plate, a nut threaded on each bolt, and filtering material between the sections, provision being also made for effecting a close and watertight joint between the two sections and for supporting the filtering material.

In the accompanying drawing—Figure 1 is an elevation of one of our improved filters complete shown attached to a faucet. Fig. 2 is a vertical sectional view. Fig. 3 is a view in perspective showing the various parts of the filter disassembled. Fig. 4 is a detail of an obvious variation in the arrangement of the pivoted bolts that serve to connect the filter sections.

Referring now to the drawing the reference letters A and B, designate respectively the upper and lower sections of the filter, which together constitute the filter chamber C, the said sections having a telescoping or slip-fit connection one with the other. Each section, for convenience and cheapness in manufacture, is preferably drawn or stamped up from comparatively thin sheet metal, and consists of a rim 1, having a relatively broad and substantially flat annular closure wall 2, and a contracted neck projecting therefrom, the neck 3, on the upper section A, being threaded for attachment to a faucet and the neck 4, on the section B, being substantially conical in form and providing an outlet spout for the filtered water.

In order to lend additional strength and rigidity to the structure we attach to the face of the annular closure wall 2 of the lower section B, an annular plate 5, having a central opening through which the neck 4 passes, the edge of the opening being preferably beveled as shown at 6, to closely hug the tapering wall of the said neck. The said plate is further provided with a pair of diametrically opposed extensions 7, each of which has an open slot 8, and between the walls of which is pivoted a bolt 9, having a threaded end to receive a thumb nut 10, for a purpose presently to appear.

Resting loosely upon the annular closure wall 2, of the upper section A, is an annular plate 12, similar to the plate 5, and having a central opening to receive the neck 4, of said section and diametrically opposed extensions 13, each having an open slot 14, to receive the ends of the bolts 9, as clearly shown in Fig. 2. Obviously, instead of pivoting the bolts 9 to the lower fixed plate 5, as shown in Fig. 2, they could equally as well be pivoted to the upper loose plate 12, as shown in Fig. 4.

When the two sections A and B are assembled in telescopic relation one with the other, and the bolts brought to the position illustrated in Fig. 2, it will be apparent that the said sections will be held tightly together and thus form between them a chamber C to receive the filtering material, presently to be described. In order to provide a watertight closure between the two sections, we provide the upper section A, with a gasket 15, the perimeter of which is preferably located in an annular groove formed by the bead 16 arranged at the upper edge of said section, the said groove serving to retain the gasket in place, and the latter constituting a yielding seat against which the upper edge of the rim 1 of the section B may be tightly drawn by means of the thumb-nuts 10. We also provide a gasket or packing ring 17, in the neck 3, to effect a close and watertight coupling with the spout of the faucet.

The lower section B has secured in the bottom thereof an upwardly arched foraminous disk 18, the marginal edge of which is preferably sprung in an annular groove formed by the bead 19, at the base of said section, and upon this foraminous disk the filtering material 20 rests. We prefer to employ a disk of cotton batting as the filtering medium, as this has been found to be entirely satisfactory and has the advantage of being quite inexpensive; but obviously we could employ some other suitable porous material.

In order to maintain the filtering disk 20, in proper position upon its foraminous supporting disk 18, and at the same time provide for the ready removal thereof when desired, we superimpose thereon a loose foraminous disk 21, of arched form, said loose disk having diametrically opposed spring tongues 22, stamped up therefrom, the said tongues serving as finger pieces to facilitate the removal of the disk, and as they project high enough to engage the under face of the annular closure wall 2 of the upper section A, when the two sections A and B, are placed together as illustrated in Fig. 2, they also serve to cause the loose foraminous disk 21 to press upon the filtering material sufficiently to hold the latter from being unduly disturbed by the flow of water through the filter.

When it is desired to substitute fresh filtering material for a worn out supply, it is not necessary to remove the entire filter from the faucet, but only the lower section B, and this may be easily and quickly accomplished by simply unscrewing or loosening the nuts 10, sufficiently to permit the bolts 9, to be disengaged from the open slots 14, in the loose annular plate 12, when the said lower section B may be removed and a fresh supply of filtering material added in an obvious manner. In reassembling the parts, care need not be taken as to the relative position of the two sections in order to effect a proper register of the bolts 9, with the open slots 14, in the plate 12, as said plate rests loosely upon the section A, and may be easily moved to proper position so that the slots will be in alinement with the bolts.

The annular plates 5, and 12, are substantially coextensive in area and surface formation with the surface area of the annular closure walls 2, and thus serve to materially strengthen said walls, which for cheapness in material and expediency in manufacture we prefer to make of sheet metal stamped or drawn to form.

We reserve to ourselves the right to such changes or modifications as come within the scope of the appended claim.

What we claim is:

A filter comprising two substantially similar sections, each section spun from a single piece of sheet metal and forming between them a filtering chamber, each section consisting of a rim and a relatively broad annular closure wall with a centrally disposed neck projecting from each closure wall, said rims telescoping one within the other whereby the depth of the filter may be varied, the neck on one section being threaded for attachment to a faucet and the other constituting a spout, a plate overlying the annular wall of each section, practically coextensive with and shaped to fit and cover said wall, one of said plates being secured to its associated section, and the other resting loosely upon the section with which it is associated, bolts pivoted to one section and adapted to engage the other section, and filtering material within said filtering chamber.

In testimony whereof we have hereunto set our hands in presence of two subscribing witnesses.

JOSEPH S. GLEDHILL.
HILTON D. BELMER.

Witnesses:
C. E. HALSTED,
P. J. BERGEN, Jr.